(12) United States Patent
De Winter

(10) Patent No.: US 6,992,845 B2
(45) Date of Patent: Jan. 31, 2006

(54) INTERCHANGEABLE OBJECTIVE FOR INTEGRATED RANGEFINDER CAMERAS

(75) Inventor: André De Winter, Leun (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 11/059,457

(22) Filed: Feb. 16, 2005

(65) Prior Publication Data
US 2005/0185304 A1 Aug. 25, 2005

(30) Foreign Application Priority Data
Feb. 23, 2004 (DE) ...................... 10 2004 009 042

(51) Int. Cl.
*G02B 7/02* (2006.01)

(52) U.S. Cl. ...................... 359/828; 359/811; 359/819; 359/827

(58) Field of Classification Search ................ 359/828, 359/811, 813, 814, 819, 821, 822, 823, 824, 359/825, 826, 827; 396/60
See application file for complete search history.

(56) References Cited

U.S. PATENT DOCUMENTS 5,359,992 A 11/1994 Hori et al.

FOREIGN PATENT DOCUMENTS

| JP | 55-000596 A | 1/1980 |
|---|---|---|
| JP | 8-43705 A | 2/1996 |

*Primary Examiner*—Timothy Thompson
(74) *Attorney, Agent, or Firm*—Foley & Lardner LLP

(57) ABSTRACT

An interchangeable objective for integrated rangefinder cameras is described, having a mechanically mounted objective head (1) and a spiral (14) with a bayonet fitting (15), the spiral (14) containing a spiral mechanism (16) for driving an objective head carrier (17) that is guided axially in a straight line and formed as a cylindrical ring, and a focusing ring (18) which is connected to the spiral mechanism (16) and can be actuated from outside, and is characterized in that, for the purpose of inserting a rear mount part (5) of the objective head (1) into the objective head carrier (17), the focusing ring (18) can be released from the spiral mechanism (16) by removing radially oriented connecting means (19) and can be pushed onto a front mount part (3) of the objective head (1), a threaded ring (7) is rotatably mounted on a central mount part (4) of the objective head (1), and the threaded ring (7) can be screwed (26) onto the objective head carrier (17) in order to connect the objective head (1) to the latter.

8 Claims, 2 Drawing Sheets

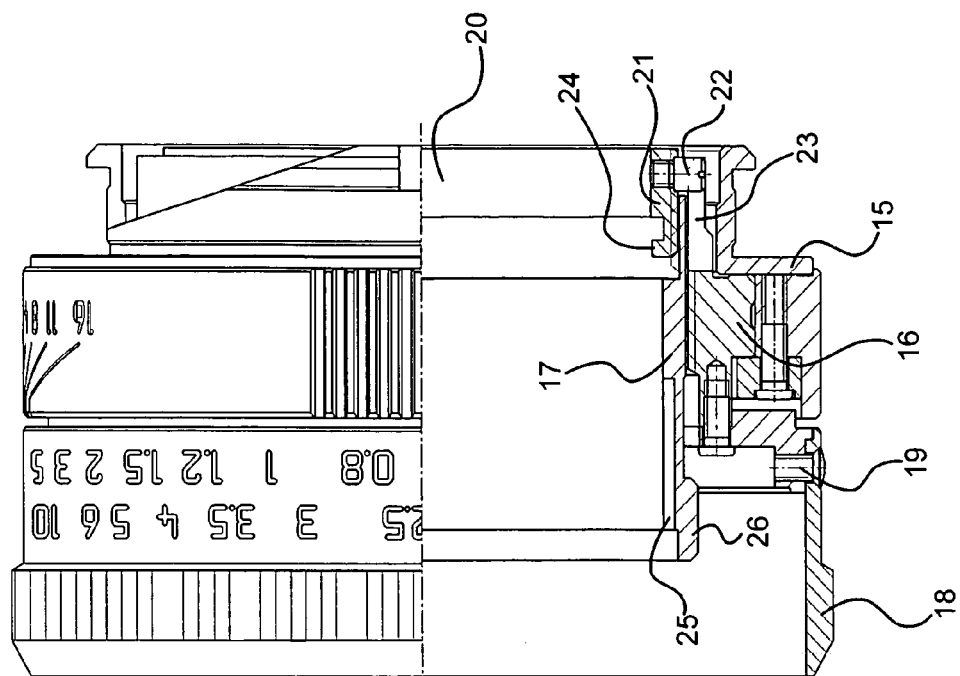
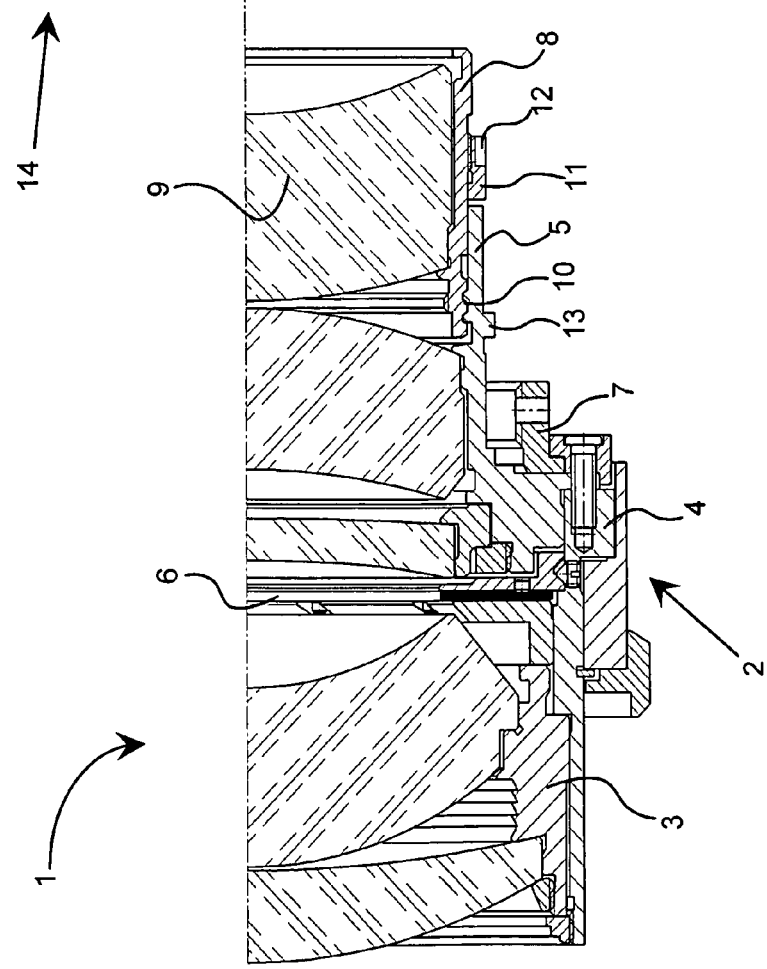
Fig. 1
Fig. 2

INTERCHANGEABLE OBJECTIVE FOR INTEGRATED RANGEFINDER CAMERAS

The invention relates to an interchangeable objective for integrated rangefinder cameras, having the features cited in the preamble of claim 1.

Interchangeable objectives of this type are widely known. It is usual to designate the drive part for the focusing of the objective a spiral. It contains all the mechanical parts for adjusting the optical elements of the objective during focusing. In addition, the device normally constructed as a bayonet for the interchangeable fitting of the objective to a camera housing is fixed to the spiral. In the case of an integrated rangefinder camera, the objective has a control cam in the opening pointing toward the camera for the purpose of adjusting an integrated rangefinder actuating lever arranged in the camera housing.

All the optical elements of the objective, together with an adjustable aperture stop, are mounted mechanically in a pre-assembled objective head. The mounted objective head is normally inserted into an objective head carrier formed as a cylindrical ring in the spiral and, from the bayonet side, is retained by a screw-on ring. The mechanical dimensioning of the screw-on ring in this case necessarily restricts the opening in the bayonet region which is free for the passage of light. The maximum diameter of the last lens element in the objective head is therefore limited on account of the standardized bayonet diameter and the control cam for the integrated rangefinder actuating lever which is additionally present.

The invention was therefore based on the object of providing an interchangeable objective with an enlarged diameter of the last lens element. In addition, there should be the possibility of arranging the last lens element to be adjustable in order to compensate for image errors in the near setting range.

In an interchangeable objective of the type mentioned at the beginning, this object is achieved by the characterizing features of claim 1. Advantageous developments emerge from the features of the subclaims.

The essential idea of the invention is to dimension and fix the focusing ring, normally firmly connected to the spiral mechanism as an integral constituent part of the spiral, in such a way that it can be released from the spiral from the outside for the purpose of mounting the objective head. After that, it should be possible to push it onto the front mount part of the objective head from the center of the objective head. As a result, in the central part of the objective, the insertion opening of the objective head carrier becomes accessible for mounting work. A threaded ring rotatably mounted on the objective head in the central part of the mount of said head can be screwed onto the objective head carrier and therefore draws the objective head into the objective head carrier as far as a stop. Appropriately mutually matched guide elements orient the objective head in the objective head carrier and in relation to the driver elements for the drive ring of the adjustable lens element. After that, the focusing ring is pushed back onto the spiral again and connected to the spiral mechanism.

The diameter of the last lens element located in the opening of the bayonet fitting can be chosen to be considerably larger than in the case of conventional objective designs. This provides the optical designer with more freedom in the development of an objective with a higher aperture.

An exemplary embodiment of the interchangeable objective according to the invention is illustrated schematically in the drawing and will be described in more detail by using the figures, in which:

FIG. 1 shows a mechanically mounted objective head,

FIG. 2 shows a spiral and

Figure 3:
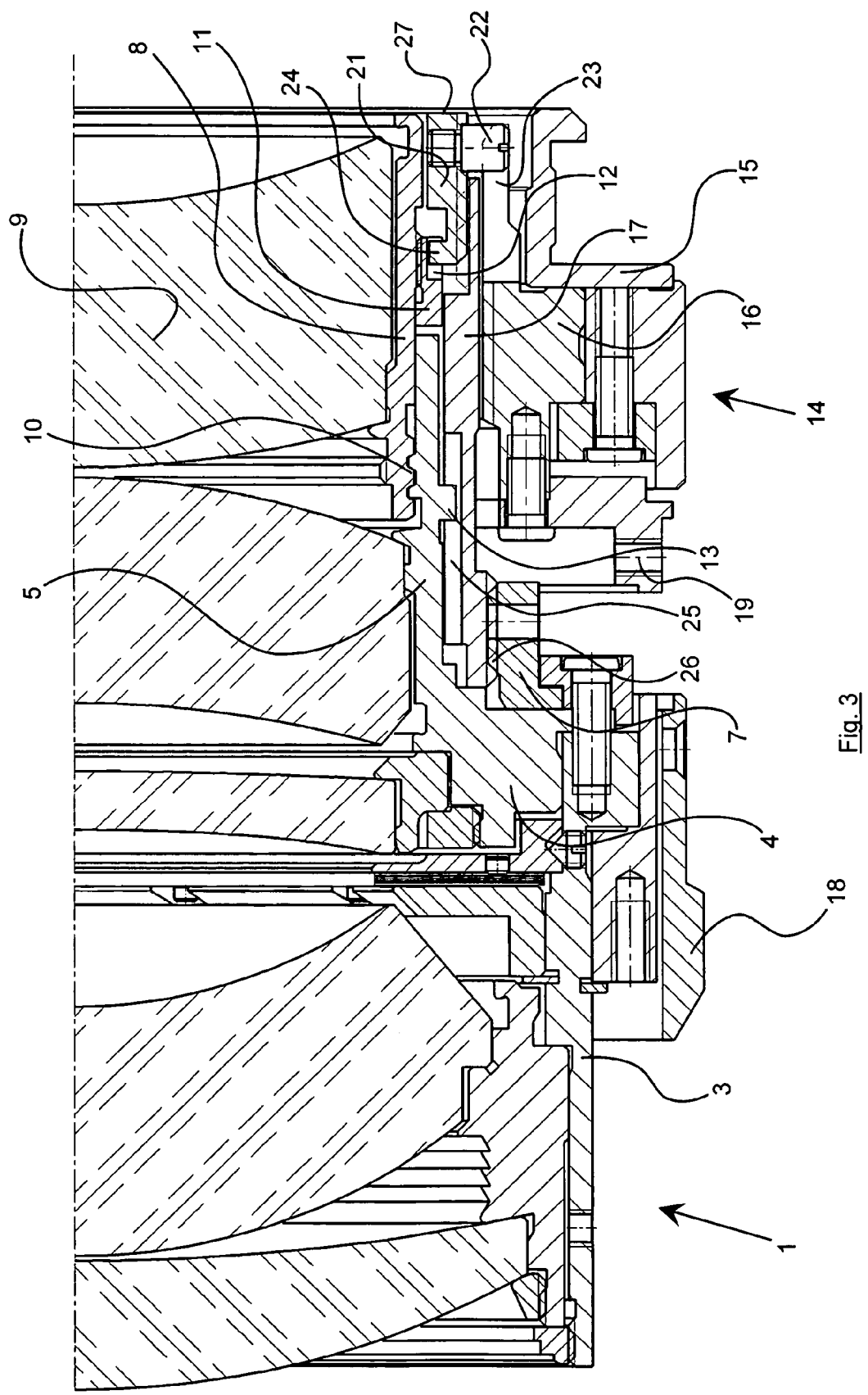
FIG. 3 shows the interchangeable objective in the mounted state.

In the objective head 1 illustrated in FIG. 1, all the optical lens elements are held in a predetermined arrangement in relation to one another in a mechanical mount 2. The mount 2 contains a front mount part 3, a central mount part 4 and a rear mount part 5.

An adjustable aperture stop 6 is inserted into the front mount part 3. On the central mount part 4, a threaded ring 7 is mounted such that it can be rotated but is fixed in the axial direction. A separate mount 8 for a rear lens element 9 is inserted into the rear mount part 5. The mount 8 can be adjusted axially by means of rotation within the mount 2 via a spiral thread 10. An actuating ring 11, which contains a driver groove 12 in the axial direction, is screwed onto the mount 8.

During the assembly of the objective head 1, the mount 8 is adjusted by means of rotation in the spiral thread 10 until the clearance of the rear lens element 9 from the lens element in front of the latter corresponds to a predetermined setting distance. After that, the actuating ring 11 is screwed onto the mount 8 and fixed in a position in which the driver groove 12 is aligned with a guide web 13 fitted to the central mount part 4 in order to align the objective head 1 radially.

The spiral 14 illustrated in FIG. 2 contains, as a stationary part, a bayonet fitting 15. A spiral mechanism 16 is mounted in the fitting such that it can rotate. The spiral mechanism 16 engages with an objective head carrier 17. The objective head carrier 17 is guided in a straight line in the spiral 14 in a manner known per se and therefore, during rotation of the spiral mechanism 16, is displaced in the axial direction. The rotation of the spiral mechanism 16 is provided by actuating a focusing ring 18 fixed to the spiral mechanism 16. The focusing ring 18 can be separated from the spiral mechanism 16 by loosening a screw connection 19 that acts in the radial direction.

Within the opening 20 of the bayonet fitting 15, a drive ring 21 is screwed into the objective head carrier 17 and, in this way, during the focusing movement of the objective head carrier 17, can be displaced axially with the latter. Screwed into the drive ring 21 is a radially oriented pin 22, which engages with an axially oriented groove 23 in the spiral mechanism 16. In the event of rotation of the spiral mechanism 16, the drive ring 21 is therefore also rotated in its screw connection. The pitch of the screw connection can be used to match the focusing setting movement of the objective head carrier 17 to the corresponding actuating travel of an integrated rangefinder actuating lever.

On the edge located within the spiral 14, the drive ring 21 has a driver lug 24 which, in the position illustrated, is aligned with a guide groove 25 in the objective head carrier 17. The outwardly pointing end face 27 of the drive ring 21 is used as a stop face for an integrated rangefinder actuating lever, not illustrated, and can additionally be provided with an axial control cam for the purpose of equalization between the focusing setting movement of the objective head carrier 17 and the corresponding actuating travel of the integrated rangefinder actuating lever.

FIG. 3 shows the objective head 1 in the assembled state with the spiral 14. The focusing ring 18 has been released from the spiral drive and pushed onto the front mount part 3 of the objective head 1. The threaded ring 7 rotatably mounted in the central mount part 4 is therefore accessible from outside for the purpose of rotation to be screwed onto the thread 26 on the objective head carrier 17.

The rear mount part 5 of the objective head 1 has been pushed into the objective head carrier 17 such that the guide web 13 engages in the guide groove 25, and the driver groove 12 engages with the driver lug 24. The threaded ring 7 is screwed onto the thread 26 applied to the objective head carrier 17 and, when the central mount part 4 strikes the objective head 1, is fixed onto the objective head carrier 17. After that, the focusing ring 18 is pushed back onto the spiral 14 and connected to the spiral mechanism 16 again.

In the event of rotation of the focusing ring 18, the entire objective head 1 is displaced in the axial direction. The rear lens element 9 together with its mount 8 is additionally rotated in the process and is displaced axially relative to the remaining lens elements via the spiral thread 10. The pitch of the spiral thread 10 is small and is designed in such a way that, during the transition from a focusing to far-removed objects to focusing on objects located in the near region, the distance of the last lens element 9 from the lens element in front of the latter is increased.

Instead of the spiral thread 10, at this point a pin/slot guide known per se in the form of a groove in the mount 8 and a ball spring-mounted in the rear mount part 5 of the objective head 1 can also be provided. The mounting of the ball can be chosen such that, when the mount 8 is inserted into the rear mount part 5 of the objective head 1, it can give way in the radial direction and can then spring into the groove.

LIST OF DESIGNATIONS

| | |
|---|---|
| 1 | Objective head |
| 2 | Mechanical mount |
| 3 | Front mount part |
| 4 | Central mount part |
| 5 | Rear mount part |
| 6 | Aperture stop |
| 7 | Threaded ring |
| 8 | Mount |
| 9 | Rear lens element |
| 10 | Spiral thread |
| 11 | Actuating ring |
| 12 | Driver groove |
| 13 | Guide web |
| 14 | Spiral |
| 15 | Bayonet fitting |
| 16 | Spiral mechanism |
| 17 | Objective head carrier |
| 18 | Focusing ring |
| 19 | Screw connection |
| 20 | Opening of the bayonet fitting |
| 21 | Drive ring |
| 22 | Radial pin |
| 23 | Axially oriented groove in the spiral mechanism |
| 24 | Driver lug |
| 25 | Guide groove |
| 26 | Thread on the objective head carrier |
| 27 | End face on the drive ring |

What is claimed is:

1. Interchangeable objective for integrated rangefinder cameras, having a mechanically mounted objective head (1) and a spiral (14) with a bayonet fitting (15), the spiral (14) containing a spiral mechanism (16) for driving an objective head carrier (17) that is guided axially in a straight line and formed as a cylindrical ring, and a focusing ring (18) which is connected to the spiral mechanism (16) and can be actuated from outside, characterized in that for the purpose of inserting a rear mount part (5) of the objective head (1) into the objective head carrier (17), the focusing ring (18) can be released from the spiral mechanism (16) by removing radially oriented connecting means (19) and can be pushed onto a front mount part (3) of the objective head (1), a threaded ring (7) is rotatably mounted on a central mount part (4) of the objective head (1), and the threaded ring (7) can be screwed (26) onto the objective head carrier (17) in order to connect the objective head (1) to the latter.

2. Interchangeable objective according to claim 1, characterized in that in the inner wall of the objective head carrier (17) and on the outer circumferential surface of the rear mount part (5) of the objective head (1) there are guide elements (25, 13) which are matched to each other and which fix the radial alignment of the objective head (1) in the objective head carrier (17).

3. Interchangeable objective according to claim 1, characterized in that, at the end of the objective head carrier (1) pointing toward the bayonet fitting (15), a drive ring (21) is arranged in the carrier such that it can rotate and is coupled to the spiral mechanism (16).

4. Interchangeable objective according to claim 3, characterized in that the end face (27) of the drive ring (21) is provided with an axial cam to control an integrated rangefinder actuating lever.

5. Interchangeable objective according to claim 1, characterized in that the objective head (1) contains a rear, separately mounted lens element (9) which is arranged in the mount of the objective head (1) such that it can be displaced in the axial direction.

6. Interchangeable objective according to claim 5, characterized in that, in order to displace the rear lens element (9), a spiral thread (10) with a low pitch is provided.

7. Interchangeable objective according to claim 5, characterized in that, in order to displace the rear lens element (9), at least one groove with a low pitch is provided in its mount (8), and a spring-mounted ball engaging in the groove is provided in the mount of the objective head (1).

8. Interchangeable objective according to claim 3, characterized in that in the end face of the actuating ring (11) on the rear lens element (9) there is arranged a driver groove (12) which, when the objective head (1) is inserted into the objective head carrier (17), can be brought into engagement with a driver lug (24) fitted to the drive ring (21).

* * * * *